(12) United States Patent
Lee et al.

(10) Patent No.: US 8,064,228 B2
(45) Date of Patent: Nov. 22, 2011

(54) POWER SUPPLY APPARATUS WITH CURRENT-SHARING FUNCTION

(75) Inventors: Shih-Chang Lee, Taipei Hsien (TW); Chung-Shu Lee, Taipei Hsien (TW)

(73) Assignee: Chicony Power Technology Co., Ltd., Taipei (TW)

( * ) Notice: Subject to any disclaimer, the term of this patent is extended or adjusted under 35 U.S.C. 154(b) by 269 days.

(21) Appl. No.: 12/509,814

(22) Filed: Jul. 27, 2009

(65) Prior Publication Data

US 2011/0019439 A1    Jan. 27, 2011

(51) Int. Cl.
    *H02M 3/335*     (2006.01)
(52) U.S. Cl. .................. 363/21.02; 363/21.04
(58) Field of Classification Search ............ 363/21.02, 363/21.03, 21.04, 125, 126, 127, 16, 21.06, 363/21.14
See application file for complete search history.

(56) References Cited

U.S. PATENT DOCUMENTS

| | | | | |
|---|---|---|---|---|
| 5,177,675 A * | 1/1993 | Archer | ............. | 363/25 |
| 5,712,772 A * | 1/1998 | Telefus et al. | ............. | 363/21.02 |
| 7,352,596 B2 * | 4/2008 | Cheng | ............. | 363/24 |
| 7,660,136 B2 * | 2/2010 | Yang | ............. | 363/21.06 |
| 7,889,520 B2 * | 2/2011 | Moiseev | ............. | 363/21.04 |

* cited by examiner

*Primary Examiner* — Gary L Laxton
(74) *Attorney, Agent, or Firm* — Chun-Ming Shih; HDLS IPR Services

(57) ABSTRACT

A power supply apparatus with a current-sharing function includes a conversion circuit, a square-wave generating circuit, a resonant circuit, and a rectifier-filter circuit. The conversion circuit has two transformers, and each of the transformers has a primary winding and two secondary windings. More particularly, two secondary windings of the different transformers are electrically connected in series and then the two in-series secondary windings are electrically connected in parallel. The square-wave generating circuit is used to switch a DC voltage into a pulsating voltage. The resonant circuit is electrically connected to the square-wave generating circuit, and having a first capacitor and the primary windings of the transformers. The rectifier-filter circuit has at least two switch components and a second capacitor, and electrically connected to the secondary windings of the transformers to rectify an AC output voltage into a DC output voltage, and the DC output voltage is outputted to at least one output terminal.

20 Claims, 11 Drawing Sheets

US 8,064,228 B2

POWER SUPPLY APPARATUS WITH CURRENT-SHARING FUNCTION

BACKGROUND OF THE INVENTION

1. Field of the Invention

The present invention relates to a power supply apparatus, and more particularly to a power supply apparatus with a current-sharing function.

2. Description of Prior Art

In electronic engineering, a DC-to-DC converter is an electronic circuit which converts a source of direct current (DC) from one voltage level to another, and the converted DC voltage is stabilized at the preset voltage value. Generally speaking, the DC-to-DC converter is divided into two categories: one is "step-down" DC-to-DC converter (namely, the output voltage is lower than the input voltage), and the other one is "step-up" DC-to-DC converter (namely, the output voltage is higher than the input voltage). The DC-to-DC converter is mainly applied to a distributed power system. Hence, the DC voltage level of the previous stage is fixed, and the DC voltage level of the next stage can be connected to the corresponding DC-to-DC converter according to the required power.

More particularly, the DC-to-DC converter can be separated into two categories: the pulse width modulation (PWM) converter and the resonant converter. The hard-switching operation of the PWM converter introduces the high switching losses and the poor efficiency. Accordingly, the soft-switching technologies have been developed for the resonant converter to reduce the switching losses and increase the efficiency.

The DC characteristic of the resonant converter could be divided into ZVS (zero-voltage switching) region and ZCS (zero-current switching) region. Accordingly, the resonant circuit structure is adopted in high-efficiency and high-power power circuits. Reference is made to FIG. 1 which is a circuit diagram of a prior art LLC resonant circuit. The LLC resonant circuit includes a DC voltage 100, a square-wave generating circuit 102, a resonant circuit 104, a conversion circuit 106, and a rectifier-filter circuit 108.

The square-wave generating circuit 102 is composed of two semiconductor components QT, QB, and on-state and off-state of the two semiconductor components QT,QB are controlled by a controller (not labeled). Hence, the square-wave generating circuit 102 can generate two different voltage levels. The resonant circuit 104 is composed of a resonant capacitor Cr and two primary windings of two transformers T1,T2. The resonant capacitor Cr is provided to filter a DC component of a pulsating voltage generated by the square-wave generating circuit 102. Also, each of the primary windings is provided to transform electrical energy into magnetic energy, and the transformed magnetic energy is delivered to corresponding secondary windings of the transformers T1, T2. The turns of the secondary windings can be represented as follows:

$$N_{secondary\_as1} + N_{secondary\_as2} = 2 \cdot N_{primary} \cdot V_{out}/V_{in} = 2 \cdot N_{secondary}$$

Where, the terms Nsecondary_as1 and Nsecondary_as2 are the turns of the secondary windings, the term Nprimary is the turns of the primary winding, the term Vin is the input voltage of the primary winding, the term Vout is the output voltage of the secondary winding, and the term Nsecondary is calculated turns of the secondary windings.

The rectifier-filter circuit 108 is composed of four diodes D1, D2, D3, D4 and a filter capacitor Co. The function of rectifying and filtering is implemented based on the single-directional turn-on property of the diodes D1, D2, D3, D4 and the charging and discharging property of the filter capacitor Co. The description of operating the LLC resonant converter is as follows. First, a pulsating voltage is generated at the point A when the DC voltage 100 inputs to the square-wave generating circuit 102. Afterward, the resonant capacitor Cr filters the DC component of the pulsating voltage and the AC component of the pulsating voltage is resonated when the pulsating voltage passes through the resonant circuit 104. Afterward, the AC voltage and the AC current are outputted at the conversion circuit 106, namely the secondary windings of the transformers T1, T2. Finally, the AC voltage is converted (rectified) into a DC voltage and the DC voltage is outputted from the rectifier-filter circuit 108.

References are made to FIG. 2(a) and FIG. 2(b), each of which is a diagram shows a B-H curve of a transformer Ta shown in FIG. 1 and a B-H curve of a transformer T2 shown in FIG. 1. It is clear to observe that the operation of the transformer core of the transformer T1 is in the first quadrant and the operation of the transformer core of the transformer T2 is in the third quadrant. Hence, the unbalanced operation of the transformer core is easily to saturate the transformer coils of the transformers T1, T2 and cause electrical shorts in the circuits. In addition, the amount of the rectifier diodes and the turns of the secondary windings are large, thus increasing the losses and reduce the efficiency.

SUMMARY OF THE INVENTION

The purpose of the present invention is to provide a power supply apparatus with a current-sharing function, and the power supply apparatus is applied to a high-power circuit.

In order to achieve the object mentioned above, the power supply apparatus with a current-sharing function includes a conversion circuit, a square-wave generating circuit, a resonant circuit, and a rectifier-filter circuit. The conversion circuit has two transformers, and each of the transformers has a primary winding and two secondary windings. More particularly, two secondary windings of the different transformers are electrically connected in series and then the two in-series secondary windings are electrically connected in parallel. Hence, a symmetrical structure and an unsymmetrical structure are formed according the connection relationship of the secondary windings.

The square-wave generating circuit is electrically connected to a DC voltage to switch the DC voltage into a pulsating voltage. The resonant circuit is electrically connected to the square-wave generating circuit, and the resonant circuit has a first capacitor and the primary windings of the transformers. The first capacitor can be a resonant capacitor. The first capacitor is provided to filter a DC component of the pulsating voltage and an AC component of the pulsating voltage is resonated, and an AC component is coupled from the primary winding of the transformer to the secondary winding of the transformer. The rectifier-filter circuit has at least two switch components and at least one second capacitor, and the second capacitor can be a resonant capacitor. The rectifier-filter circuit is electrically connected to the secondary windings of the transformers to rectify an AC output voltage outputted from the secondary windings into a DC output voltage, and the DC output voltage outputted to at least one output terminal.

Accordingly, the secondary windings of two transformers are electrically connected in series to balance the magnetic flux of the two transformers to provide a current-sharing function. In addition, the amount of the diodes and the turns of the secondary windings is less to reduce the losses and increase the efficiency.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 3:
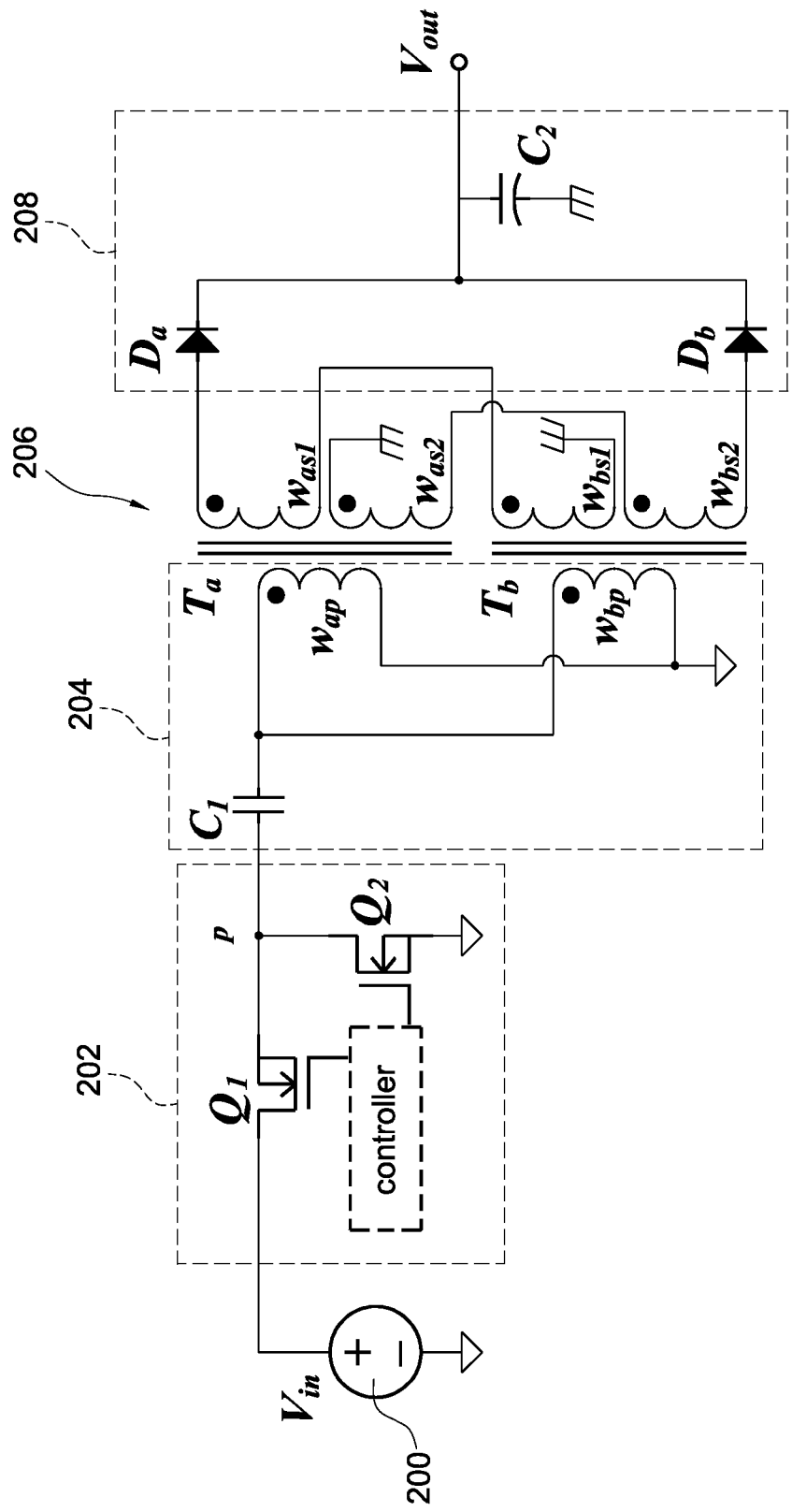
FIG. 3 is a circuit diagram of a first preferred embodiment of a power supply apparatus according to the present invention.

Reference is made to FIG. 3 which is a circuit diagram of a first preferred embodiment of a power supply apparatus according to the present invention. The power supply apparatus is a DC-to-DC converter to convert a DC voltage 200 at an input terminal Vin from one voltage level to another voltage level required for a back-end circuit. The power supply apparatus includes a square-wave generating circuit 202, a resonant circuit 204, a conversion circuit 206, and a rectifier-filter circuit 208.

The square-wave generating circuit 202 is a half-bridge circuit which is composed of two semiconductor components. The square-wave generating circuit 202 is electrically connected to the DC voltage to convert the DC voltage 200 into two different voltage levels of the pulsating voltage. More particularly, the semiconductor components are a first semiconductor component Q1 and a second semiconductor component Q2, respectively. The conversion circuit 206 has two transformers Ta, Tb, and each of the transformers Ta, Tb has a primary winding and two secondary windings. The primary windings Wap, Wbp of the transformers Ta, Tb are connected in parallel to the resonant circuit 204. Also, each two of the secondary windings Was1, Was2, Wbs2, Wbs2 of the transformers Ta, Tb are connected in series, and after that two series-connected secondary windings are connected in parallel to the rectifier-filter circuit 208. More particularly, the secondary winding Was1 is connected in series to the secondary winding Wbs1, and the secondary winding Was2 is connected in series to the secondary winding Wbs2 to form a vertical balanced and symmetrical structure. The turns of the secondary windings can be represented as follows:

$$N\text{secondary\_}as1 + N\text{secondary\_}as2 = N\text{secondary}$$

Where, the terms Nsecondary_as1 and Nsecondary_as2 are the turns of the secondary windings, and the term Nsecondary is calculated turns of the secondary windings.

The resonant circuit 204 is composed of a first capacitor C1 and the primary windings Wap, Wbp of the conversion circuit 206. Also the resonant circuit 204 is electrically connected to the square-wave generating 202. More particularly, the first capacitor C1 is a resonant capacitor and is provided to filter a DC component of the pulsating voltage, and an AC component is coupled from the primary winding of the conversion circuit 206 to the secondary winding of the conversion circuit 206. The rectifier-filter circuit 208 has two switch components providing a rectifying function and a second capacitor C2 providing a filtering function. In this embodiment, the rectifier-filter circuit 208 includes a rectifier circuit and a filter circuit. Also, the two switch components are two diodes, which is a first rectifier diode Da and is a second rectifier diode Db, respectively. Accordingly, the rectifier circuit is a diode rectifier circuit. The first rectifier diode Da and the second rectifier diode Db are in order electrically connected to the secondary windings Was1, Wbs1 of the transformers Ta, Tb and the secondary windings Wbs2, Was2 of the transformers Ta, Tb, respectively. The rectifier diodes Da, Db, Dc, Dd of the rectifier-filter circuit 208 are used to rectify an AC output voltage outputted from the secondary windings into a pulsating voltage. The second capacitor C2 is a filter capacitor to reduce a voltage ripple of the DC output voltage to smooth the variation of the DC output voltage based on the charging and discharging property of the second capacitor C2.

The detailed operation is explained as follows. The voltage at point p is a positive voltage referenced to a ground when the first semiconductor component Q1 of the square-wave generating circuit 202 is turn-on and the second semiconductor component Q2 of the square-wave generating circuit 202 is turn-off. Hence, the voltages at the dot ends of the transformers of the conversion circuit 206 are positive. It is only that the first rectifier diode Da of the rectifier-filter circuit 208 is turn-on and current flows through the first rectifier diode Da. Also, the direction of the current flows in order through the ground, the secondary winding Wbs1, the secondary winding Was1, the first rectifier diode Da, and an output terminal Vout. Accordingly, the currents flowing through the secondary winding Was1 and the secondary winding Wbs1 are equal, whereby identical and balanced magnetic flux pass the two transformers Ta, Tb to avoid saturating transformer coils of the transformers Ta, Tb and increase the utilization of the coils.

The voltage at point p is a negative voltage referenced to the ground when the first semiconductor component Q1 of the square-wave generating circuit 202 is turn-off and the second semiconductor component Q2 of the square-wave generating circuit 202 is turn-on. Hence, the voltages at the dot ends of the transformers of the conversion circuit 206 are negative. It is only that the second rectifier diode Db of the rectifier-filter circuit 208 is turn-on and current flows through the second rectifier diode Db. Also, the direction of the current flows in order through the ground, the secondary winding Was2, the secondary winding Wbs2, the second rectifier diode Db, and the output terminal Vout. Accordingly, the currents flowing through the secondary winding Was2 and the secondary winding Wbs2 are equal, whereby identical and balanced magnetic flux pass the two transformers Ta, Tb to avoid saturating coils of the transformers Ta, Tb and increase the utilization of the coils.

Figure 4:
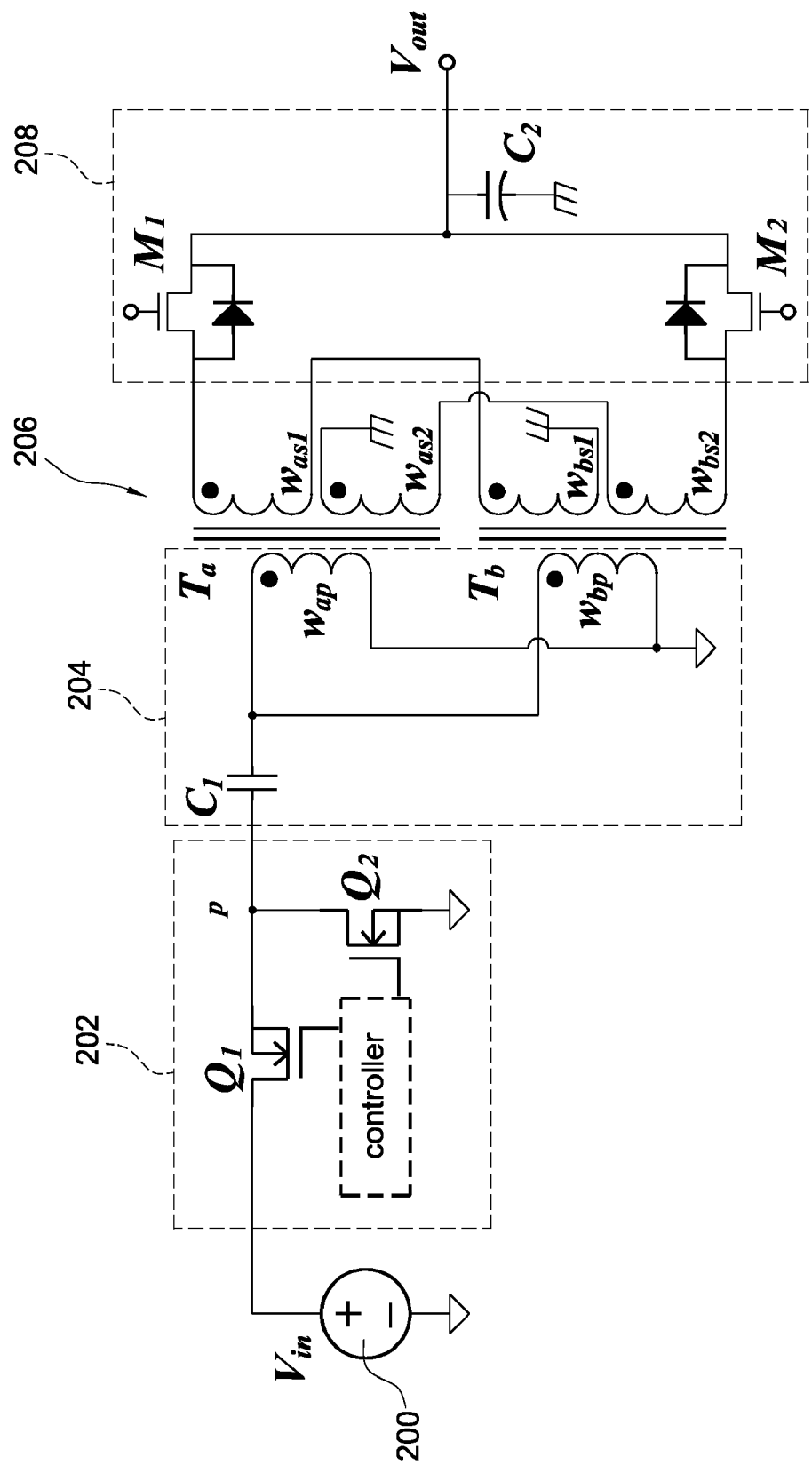
FIG. 4 is a circuit diagram of a second preferred embodiment of the power supply apparatus.

Reference is made to FIG. 4 which is a circuit diagram of a second preferred embodiment of the power supply apparatus. The power supply apparatus includes a square-wave generating circuit 202, a resonant circuit 204, a conversion circuit 206, and a rectifier-filter circuit 208. More particularly, the connection relationship among the square-wave generating circuit 202, the resonant circuit 204, and the conversion circuit 206 is the same as that shown in FIG. 3. However, the components of the rectifier-filter circuit 208 are only different.

In this embodiment, the rectifier-filter circuit 208 includes two switch components, namely, two metal oxide semiconductor field effect transistors (MOSFETs) M1, M2, and a second capacitor C2. More particularly, the two MOSFETs M1, M2 compose a synchronous rectifier. The rectifier-filter circuit 208 further includes two diodes connected between a drain and a source of the MOSFETs. The two diodes are used to avoid generating a high breakdown voltage, which tends to damage the two MOSFETs M1, M2, and further to increase switching speed of the two MOSFETs M1, M2. The second capacitor C2 is a filter capacitor to reduce a voltage ripple of the DC output voltage. In addition, a gate of the MOSFETs that is electrically connected to a switch driving circuit (not shown) is driven to control the MOSFETs.

The synchronous rectifier circuit provides the MOSFETs with lower on-resistances to replace the diodes to reduce losses of the rectifier circuit and increase efficiency of the power supply apparatus.

Figure 1:
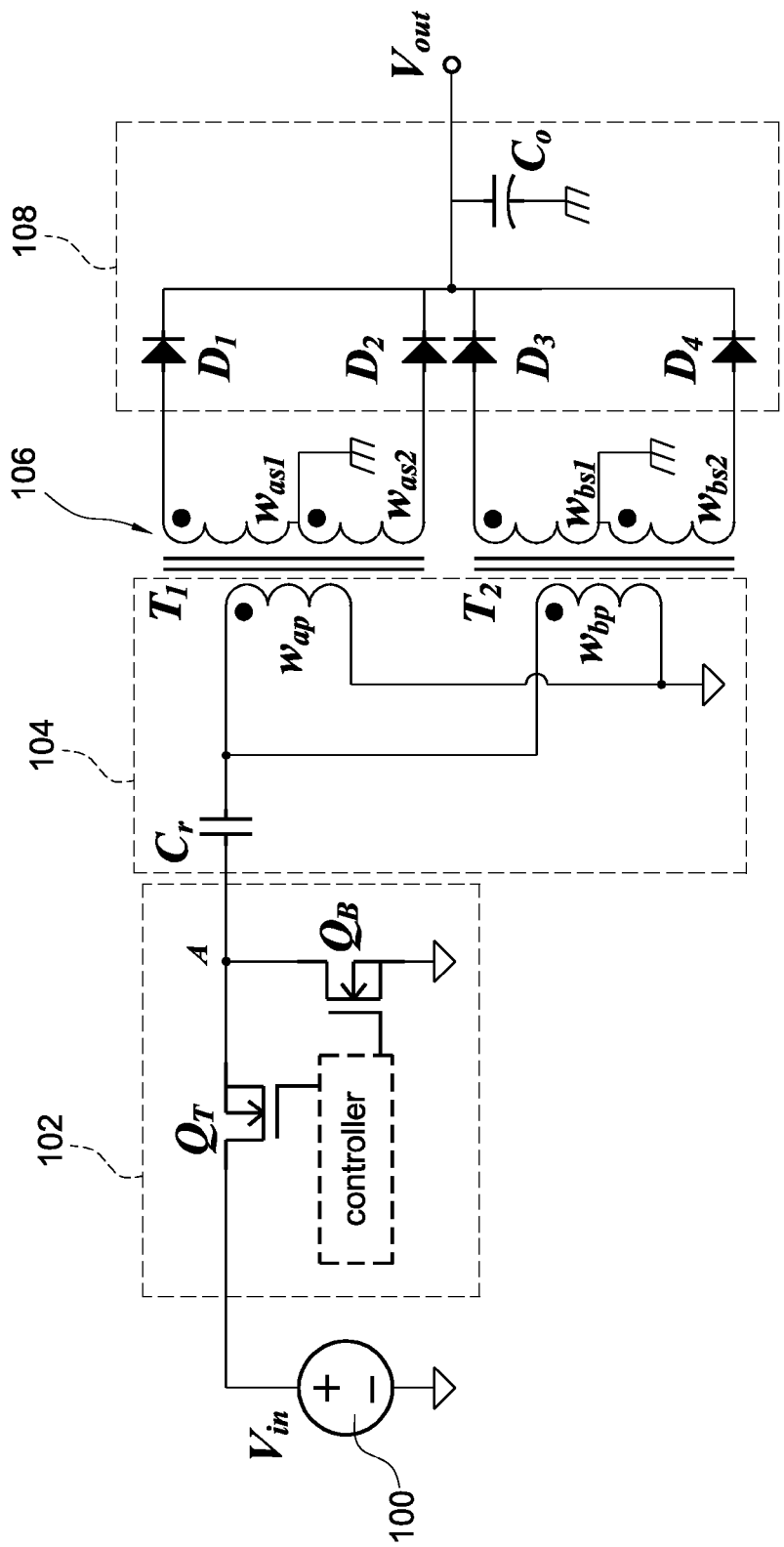
FIG. 1 is a circuit diagram of a prior art LLC resonant circuit.
Figure 2A:
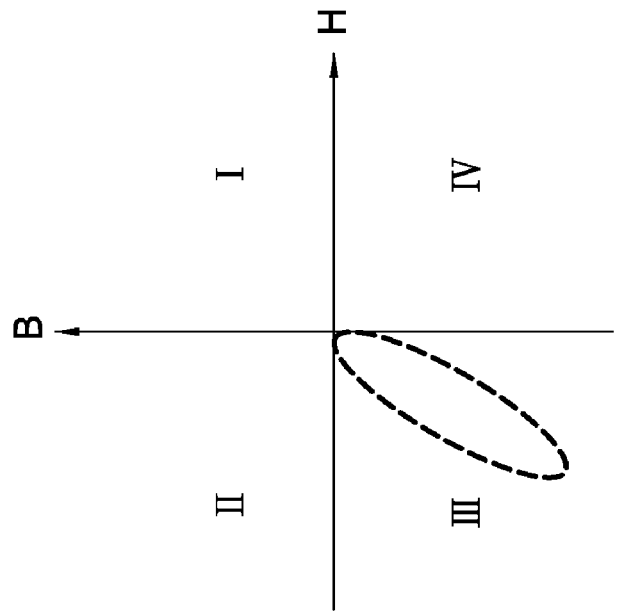
FIG. 2(a) is a diagram shows a B-H curve of a transformer Ta shown in FIG. 1.
Figure 2B:
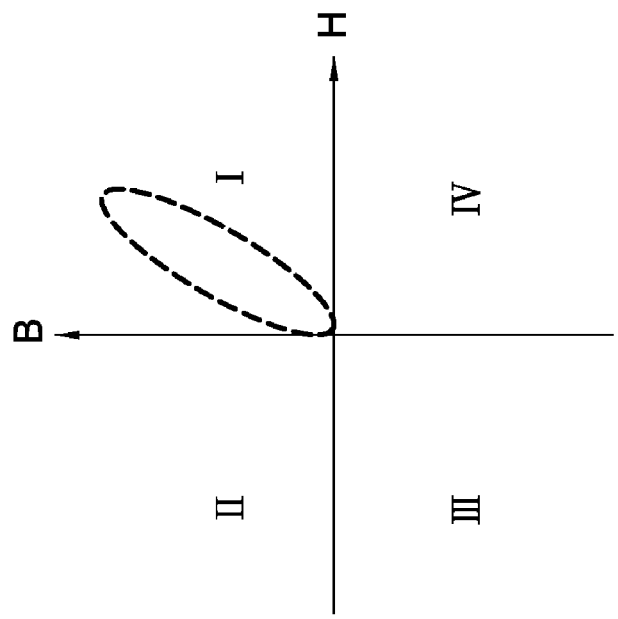
FIG. 2(b) is a diagram shows a B-H curve of a transformer T2 shown in FIG. 1.
Figure 5:
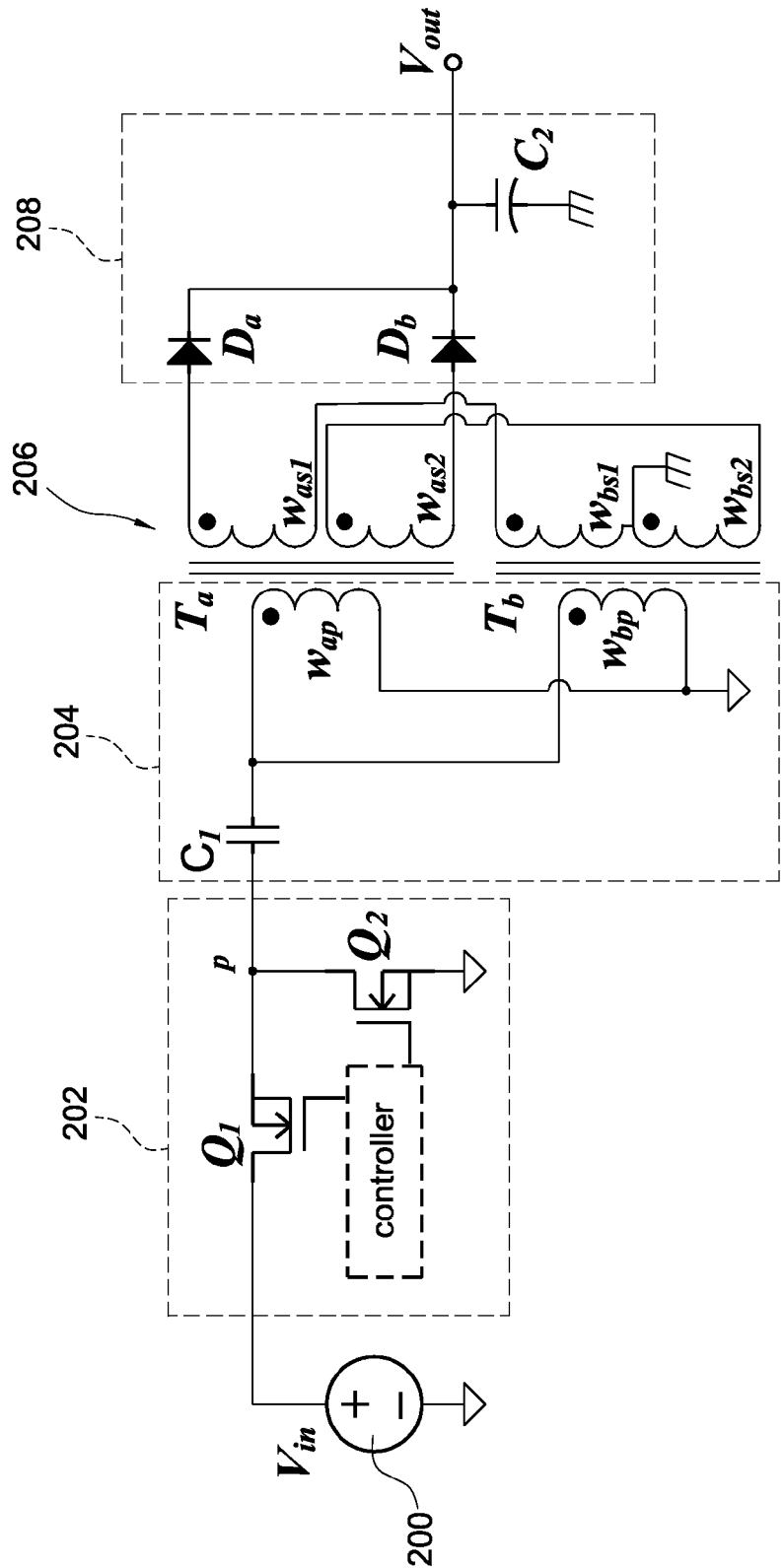
FIG. 5 is a circuit diagram of a third preferred embodiment of the power supply apparatus.

Reference is made to FIG. 5 which is a circuit diagram of a third preferred embodiment of the power supply apparatus. More particularly, the connection relationship among the square-wave generating circuit 202, the resonant circuit 204, and the conversion circuit 206 is the same as that shown in FIG. 2. However, the third preferred embodiment has different connection relationship between the secondary windings of the conversion circuit 206 and the rectifier-filter circuit 208. Namely, the first rectifier diode Da and the second rectifier diode Db are in order electrically connected to the secondary windings Was1, Wbs1 and the secondary windings Was2, Wbs2 of the conversion circuit 206, respectively. Accordingly, the connection between the conversion circuit 206 and the rectifier-filter circuit 208 is an unbalanced and unsymmetrical structure which is different from the first preferred embodiment. Also, the direction of current flows through the conversion circuit 206 and the rectifier-filter circuit 208 is different from the first preferred embodiment, so the detailed operation is explained as follows.

The direction of the current flows in order through the ground, the secondary winding Wbs1, the secondary winding Was1, the first rectifier diode Da, and the output terminal Vout when the first rectifier diode Da is turn-on. Also, the direction of the current flows in order through the ground, the secondary winding Wbs2, the secondary winding Was2, the second rectifier diode Db, and the output terminal Vout when the second rectifier diode Db is turn-on.

In addition, the MOSFETs with lower on-resistance can be used to replace the diodes to implement the function of synchronous rectification.

Figure 6:
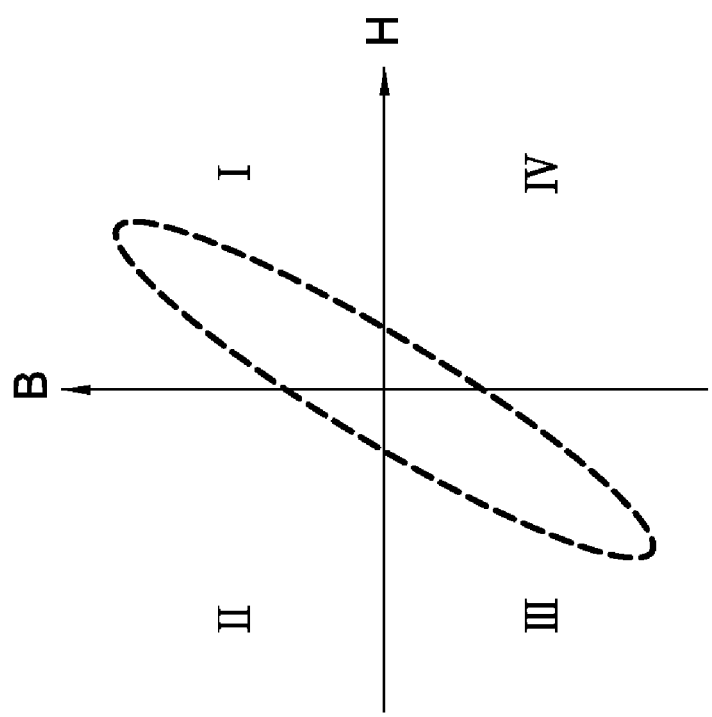
FIG. 6 is a diagram shows a B-H curve of a transformer Ta or a transformer Tb of the power supply apparatus.

Reference is made to FIG. 6 which is a diagram shows a B-H curve of a transformer Ta or a transformer Tb of the power supply apparatus. It is clear to observe that the operation of the transformer core of the transformer Ta or the transformer Tb is in the first quadrant and the third quadrant to avoid saturating the transformer coils of the transformers Ta, Tb.

Figure 7A:
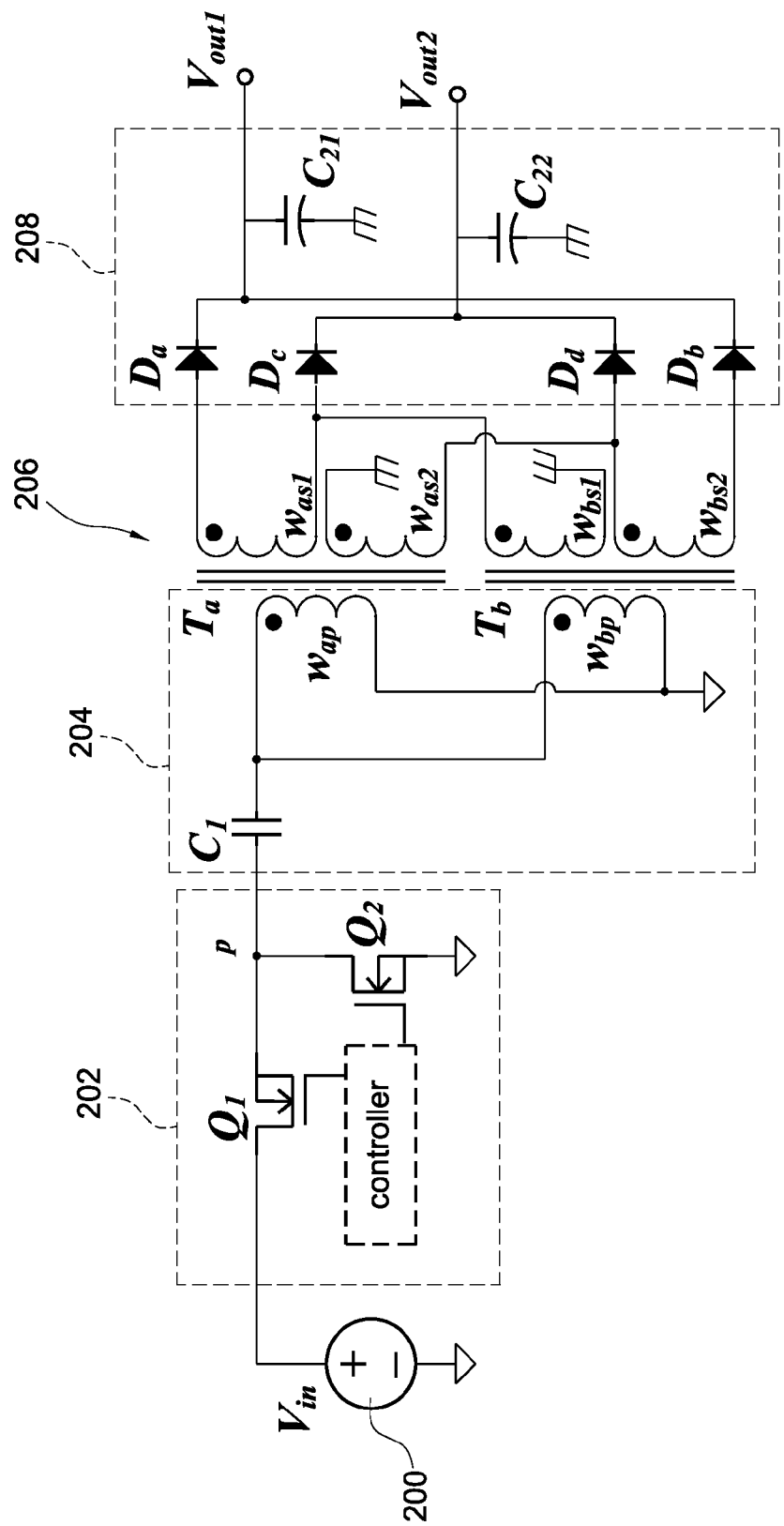
FIG. 7(a) is a circuit diagram of a fourth preferred embodiment of the power supply apparatus.
Figure 7B:
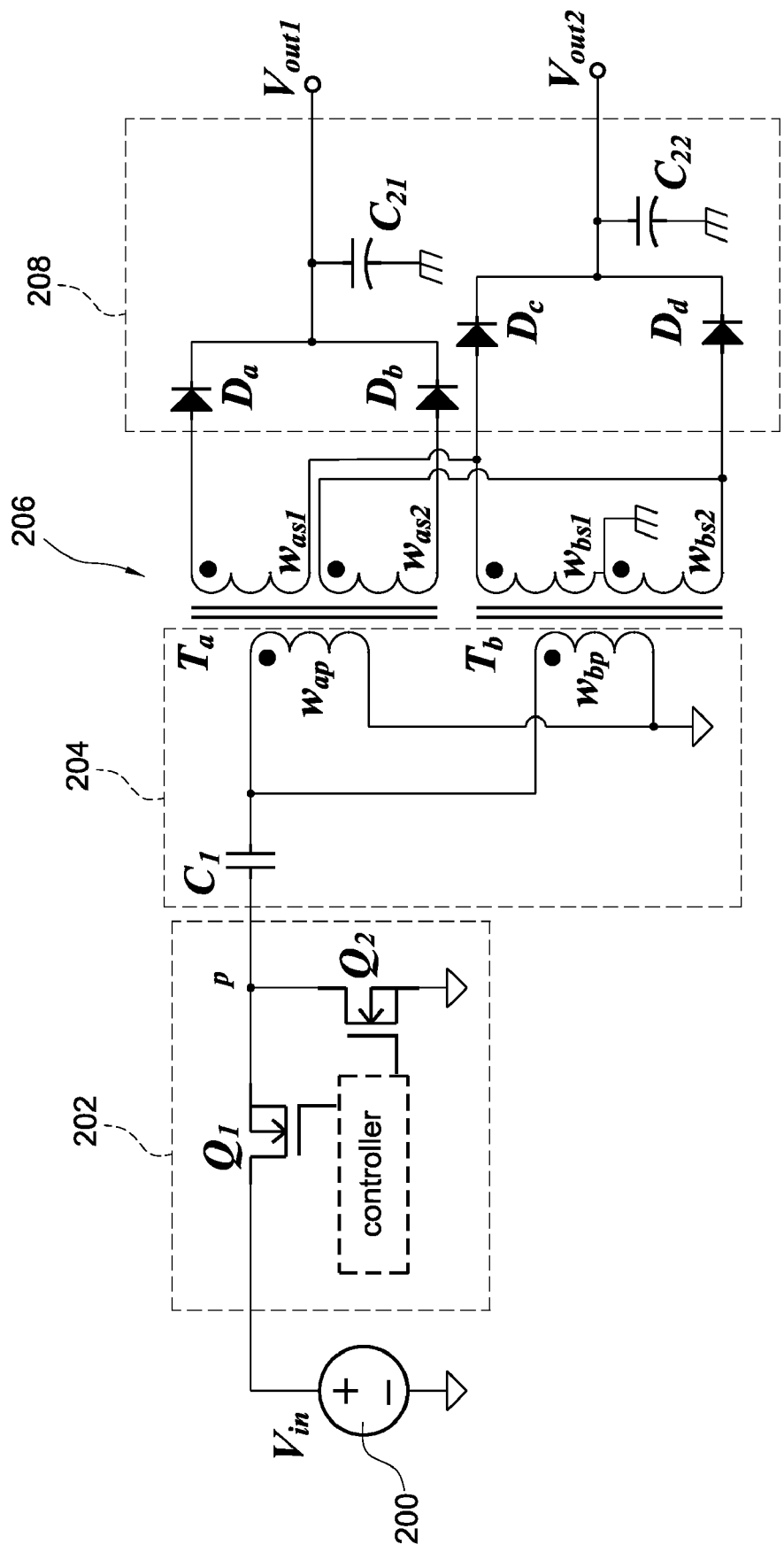
FIG. 7(b) is a circuit diagram of a fifth preferred embodiment of the power supply apparatus.

In addition, the power supply apparatus can be used to provide dual output terminals Vout1, Vout2. References are made to FIG. 7(a) and FIG. 7(b), each of which is a circuit diagram of a fourth preferred embodiment and a fifth preferred embodiment of the power supply apparatus, respectively. The main feature is that each of the power supply apparatuses has dual output terminals. Accordingly, the rectifier-filter circuit 208 includes four rectifier diodes, namely, a first rectifier diode Da, a second rectifier diode Db, a third rectifier diode Dc, and a fourth rectifier diode Dd. In FIG. 7(a), one terminal of the first rectifier diode Da and one terminal of the third rectifier diode Dc of the rectifier-filter circuit 208 are electrically connected to two terminals of the secondary winding Was1. Also, the other terminal of the first rectifier diode Da is electrically connected to a third capacitor C21 and a first output Vout1, and the other terminal of the third rectifier diode Dc is electrically connected to a fourth capacitor C22 and a second output Vout2. In addition, one terminal of the second rectifier diode Db and one terminal of the fourth rectifier diode Dd of the rectifier-filter circuit 208 are electrically connected to two terminals of the secondary winding Wbs2. Also, the other terminal of the second rectifier diode Db is electrically connected to the third capacitor C21 and the first output Vout1, and the other terminal of the fourth rectifier diode Dd is electrically connected to the fourth capacitor C22 and the second output Vout2. In FIG. 7(b), one terminal of the first rectifier diode Da and one terminal of the third rectifier diode Dc of the rectifier-filter circuit 208 are electrically connected to two terminals of the secondary winding Was1. Also, the other terminal of the first rectifier diode Da is electrically connected to the third capacitor C21 and the first output Vout1, and the other terminal of the third rectifier diode Dc is electrically connected to the fourth capacitor C22 and the second output Vout2. In addition, one terminal of the second rectifier diode Db and one terminal of the fourth rectifier diode Dd of the rectifier-filter circuit 208 are electrically connected to two terminals of the secondary winding Was2. Also, the other terminal of the second rectifier diode Db is electrically connected to the third capacitor C21 and the first output Vout1, and the other terminal of the fourth rectifier diode Dd is electrically connected to the fourth capacitor C22 and the second output Vout2.

The detailed operation is explained as follows. The first rectifier diode Da and the third rectifier diode Dc are turn-on and current flows to the first output terminal Vout1 and the second output terminal Vout2 when the first semiconductor component Q1 of the square-wave generating circuit 202 is turn-on and the second semiconductor component Q2 of the square-wave generating circuit 202 is turn-off. In addition, the second rectifier diode Db and the fourth rectifier diode Dd are turn-on and current flows to the first output terminal Vout1 and the second output terminal Vout2 when the first semiconductor component Q1 is turn-off and the second semiconductor component Q2 is turn-on. Accordingly, the dual output terminal Vout1, Vout2 can output the identical voltage and current to the back-end circuit.

Figure 8:
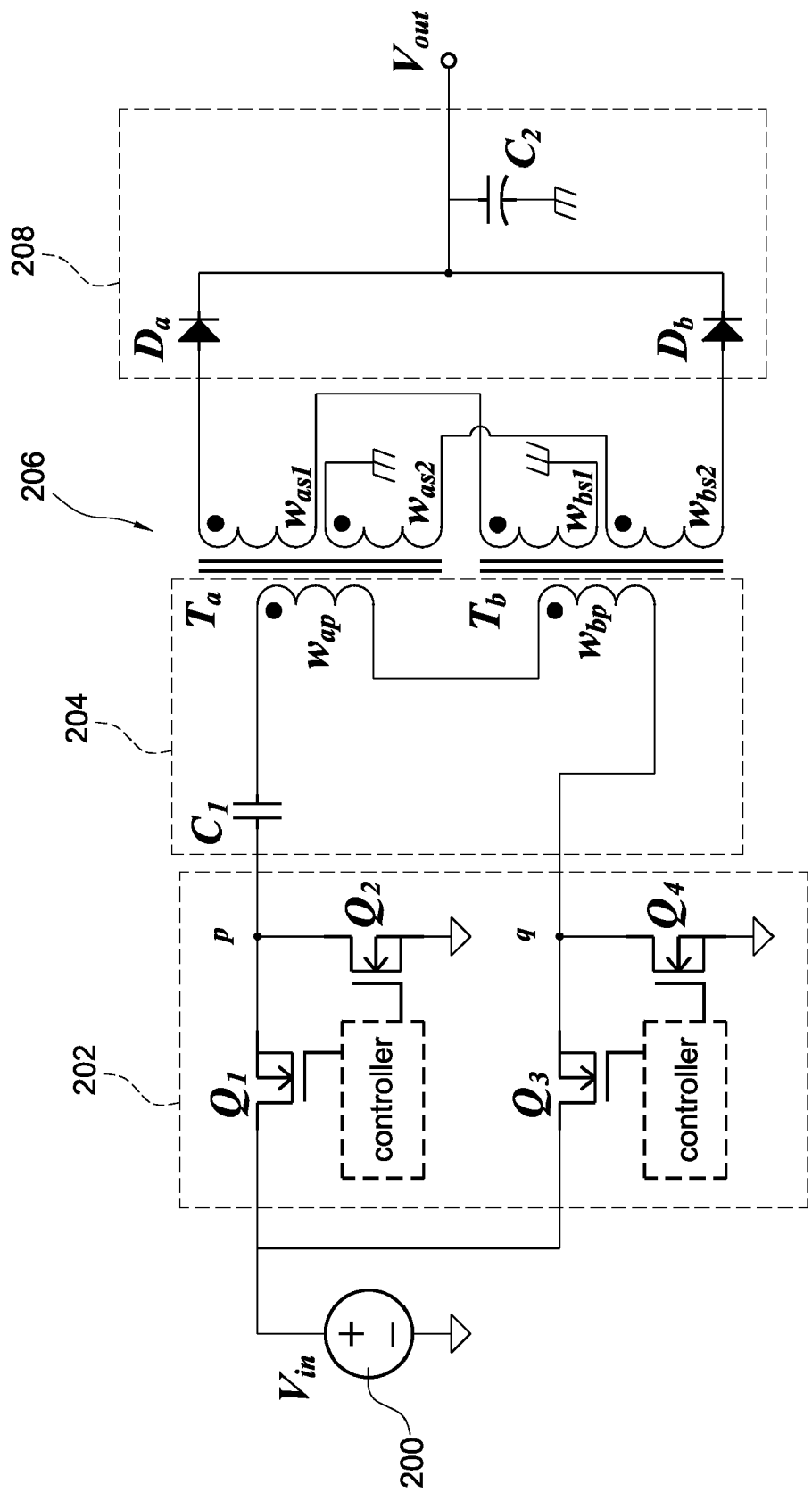
FIG. 8 is a circuit diagram of a sixth preferred embodiment of the power supply apparatus.

Reference is made to FIG. 8 which is a circuit diagram of a sixth preferred embodiment of the power supply apparatus. The half-bridge circuit of the square-wave generating circuit 202 can be replaced by a full-bridge circuit. The full-bridge circuit is composed of four semiconductor components, namely, a first semiconductor component Q1, a second semiconductor component Q2, a third semiconductor component Q3, and a fourth semiconductor component Q4, respectively.

More particularly, the first semiconductor component Q1 and the second semiconductor component Q2 are electrically connected together and further electrically connected to a controller. Also, the third semiconductor component Q3 and the fourth semiconductor component Q4 are electrically connected together and further electrically connected to another controller. A primary winding Wap and a primary winding Wbp of the conversion circuit 206 are electrically connected in series. The detailed operation is explained as follows.

First, a pulsating voltage is generated at the point p and the point q when a DC voltage 200 inputs to the square-wave generating circuit 202. Afterward, a first capacitor C1 of the resonant circuit 204 filters the DC component of the pulsating voltage and the AC component of the pulsating voltage is resonated when the pulsating voltage passes through the resonant circuit 204. Afterward, the secondary windings of the transformers Ta, Tb can reduce an AC voltage and an AC current according to the magnetic flux coupled. Also, the AC voltage and the AC current are rectified and filtered to output a pulsating voltage by a rectifier-filter circuit 208. The second capacitor C2 is a filter capacitor to reduce a voltage ripple of the DC output voltage to smooth the variation of the DC output voltage based on the charging and discharging property of the second capacitor C2.

Figure 9:
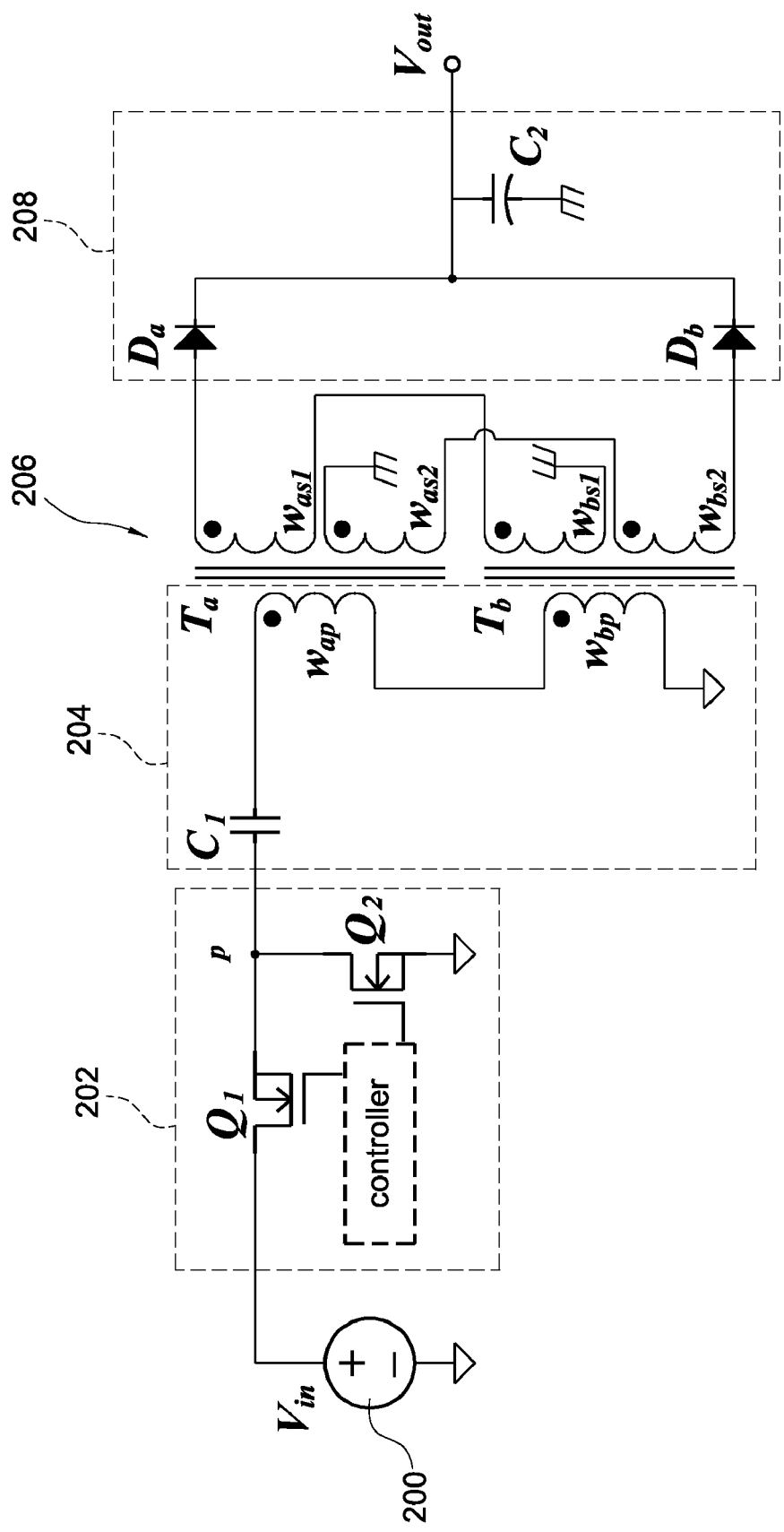
FIG. 9 is a circuit diagram of a seventh preferred embodiment of the power supply apparatus.
Figure 10:
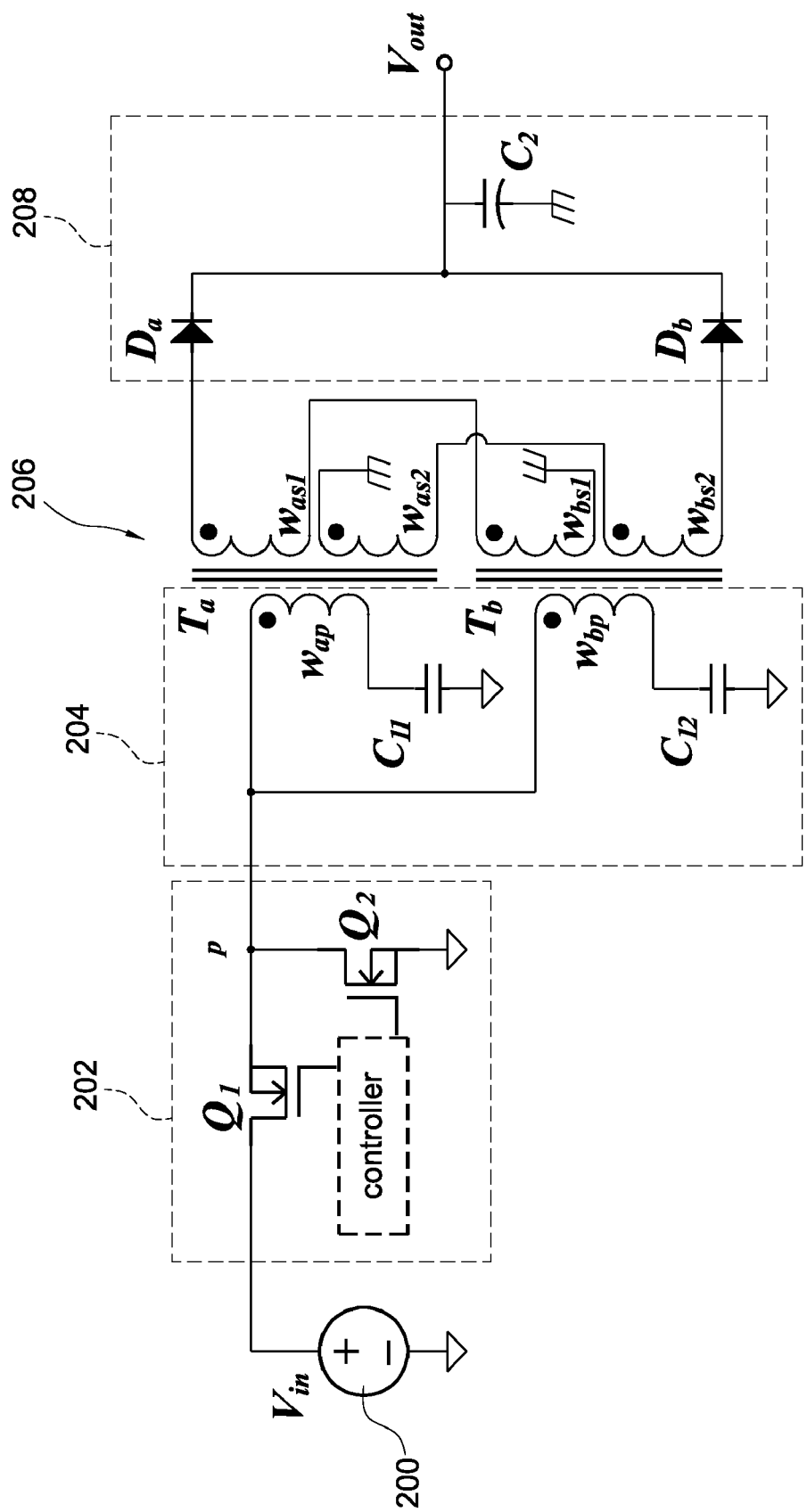
FIG. 10 is circuit diagram of an eighth preferred embodiment of the power supply apparatus.

The main feature of the power supply apparatus is variation of connecting manner for the secondary windings, so the primary windings of the transformers can be electrically connected to varied resonant circuits 204, such as shown in FIG. 9 and FIG. 10. As shown in FIG. 9, the primary windings Wap, Wbp are electrically connected in series. The operation voltages of the primary windings Wap, Wbp are generated by dividing the voltage outputted from the square-wave generating circuit 202. As shown in FIG. 10, another resonant circuit 204 is provided. Two resonant capacitors C11, C12 are electrically connected in parallel to the primary winding to filter the DC component and pass the AC component.

Accordingly, the secondary windings of two transformers are electrically connected in series to balance the magnetic flux of the two transformers to provide a current-sharing function. In addition, the amount of the diodes and the turns of the secondary windings is less to reduce the losses and increase the efficiency.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus with a current-sharing function, comprising:
a conversion circuit having a first transformer and a second transformer; the first transformer having a primary winding, a first secondary winding, and a second secondary winding; the second transformer having a primary winding, first secondary winding, and a second secondary winding; wherein the first secondary winding of the first transformer is electrically connected to the first secondary winding of the second transformer in series; the second secondary winding of the first transformer is electrically connected to the second secondary winding of the second transformer in series; and then the two in-series secondary windings are electrically connected in parallel; and the two transformers are symmetrical;
a square-wave generating circuit electrically connected to a DC voltage, and the square-wave generating circuit switching the DC voltage into a pulsating voltage;
a resonant circuit electrically connected to the square-wave generating circuit, and the resonant circuit having a first capacitor and the primary windings of the transformers; wherein the first capacitor is provided to filter a DC component of the pulsating voltage, and an AC component is coupled from the primary winding of the transformer to the secondary winding of the transformer; and
a rectifier-filter circuit having at least two switch components and electrically connected to the secondary windings of the transformers to rectify an AC output voltage outputted from the secondary windings into a DC output voltage, and the DC output voltage outputted to at least one output terminal.

2. The power supply apparatus in claim 1, wherein the rectifier-filter circuit further comprising at least a second capacitor, and the second capacitor is a filter capacitor to reduce a voltage ripple of the DC output voltage.

3. The power supply apparatus in claim 1, wherein the rectifier-filter circuit includes a rectifier circuit and a filter circuit, and the rectifier circuit is a diode rectifier circuit when two diodes are used to be the switch components.

4. The power supply apparatus in claim 1, wherein the rectifier-filter circuit includes a rectifier circuit and a filter circuit, and the rectifier circuit is a synchronous rectifier circuit when two MOSFETs are used to be the switch components.

5. The power supply apparatus in claim 4, wherein the rectifier circuit further has two diodes connected between a drain and a source of the MOSFETs.

6. The power supply apparatus in claim 1, wherein the two primary windings of the transformers of the conversion circuit are electrically connected in parallel.

7. The power supply apparatus in claim 1, wherein the two primary windings of the transformers of the conversion circuit are electrically connected in series.

8. The power supply apparatus in claim 1, wherein the square-wave generating circuit is a half-bridge circuit which is composed of two semiconductor components.

9. The power supply apparatus in claim 1, wherein the square-wave generating circuit is a full-bridge circuit which is composed of four semiconductor components.

10. The power supply apparatus in claim 1, wherein the first capacitor is a resonant capacitor.

11. A power supply apparatus with a current-sharing function, comprising:
a conversion circuit having a first transformer and a second transformer; the first transformer having a primary winding, a first secondary winding, and a second secondary winding; the second transformer having a primary winding, a first secondary winding, and a second secondary winding; wherein the first secondary winding of the first transformer is electrically connected to the first secondary winding of the second transformer in series; the second secondary winding of the first transformer is electrically connected to the second secondary winding of the second transformer in series; and then the two in-series secondary windings are electrically connected in parallel; and the two transformers are unsymmetrical;

a square-wave generating circuit electrically connected to a DC voltage, and the square-wave generating circuit switching the DC voltage into a pulsating voltage;

a resonant circuit electrically connected to the square-wave generating circuit, and the resonant circuit having a first capacitor and the primary windings of the transformers; wherein the first capacitor is provided to filter a DC component of the pulsating voltage, and an AC component is coupled from the primary winding of the transformer to the secondary winding of the transformer; and a rectifier-filter circuit having at least two switch components and electrically connected to the secondary windings of the transformers to rectify an AC output voltage outputted from the secondary windings into a DC output voltage, and the DC output voltage outputted to at least one output terminal.

12. The power supply apparatus in claim 11, wherein the rectifier-filter circuit further comprising at least a second capacitor, and the second capacitor is a filter capacitor to reduce a voltage ripple of the DC output voltage.

13. The power supply apparatus in claim 11, wherein the rectifier-filter circuit includes a rectifier circuit and a filter circuit, and the rectifier circuit is a diode rectifier circuit when two diodes are used to be the switch components.

14. The power supply apparatus in claim 11, wherein the rectifier-filter circuit includes a rectifier circuit and a filter circuit, and the rectifier circuit is a synchronous rectifier circuit when two MOSFETs are used to be the switch components.

15. The power supply apparatus in claim 14, wherein the rectifier circuit further has two diodes connected between a drain and a source of the MOSFETs.

16. The power supply apparatus in claim 11, wherein the two primary windings of the transformers of the conversion circuit are electrically connected in parallel.

17. The power supply apparatus in claim 11, wherein the two primary windings of the transformers of the conversion circuit are electrically connected in series.

18. The power supply apparatus in claim 11, wherein the square-wave generating circuit is a half-bridge circuit which is composed of two semiconductor components.

19. The power supply apparatus in claim 11, wherein the square-wave generating circuit is a full-bridge circuit which is composed of four semiconductor components.

20. The power supply apparatus in claim 11, wherein the first capacitor is a resonant capacitor.

* * * * *